(12) United States Patent
Yu

(10) Patent No.: US 11,347,250 B2
(45) Date of Patent: May 31, 2022

(54) ADAPTIVE REGULATOR CONTROL FOR VARIABLE LOAD

(71) Applicant: pSemi Corporation, San Diego, CA (US)

(72) Inventor: Tim Wen Hui Yu, Fremont, CA (US)

(73) Assignee: pSemi Corporation, San Diego, CA (US)

( * ) Notice: Subject to any disclaimer, the term of this patent is extended or adjusted under 35 U.S.C. 154(b) by 0 days.

(21) Appl. No.: 16/442,126

(22) Filed: Jun. 14, 2019

(65) Prior Publication Data

US 2020/0393862 A1    Dec. 17, 2020

(51) Int. Cl.
*G05F 1/575*    (2006.01)
*G06F 1/26*    (2006.01)

(52) U.S. Cl.
CPC ............... *G05F 1/575* (2013.01); *G06F 1/26* (2013.01)

(58) Field of Classification Search
CPC ............ G05F 1/126; G05F 1/575; G05F 1/56; H02M 3/1582; H02M 3/1584; H02M 1/10; H02M 2001/0007; H02M 3/02
See application file for complete search history.

(56) References Cited

U.S. PATENT DOCUMENTS

| | | | |
|---|---|---|---|
| 11,223,273 B2* | 1/2022 | Chang | H02M 1/14 |
| 2009/0237053 A1* | 9/2009 | Gan | H02M 3/156 323/283 |
| 2014/0084886 A1* | 3/2014 | Causse | H02M 3/158 323/282 |
| 2014/0210445 A1* | 7/2014 | Hasegawa | H04W 64/006 323/284 |
| 2015/0338866 A1* | 11/2015 | Hu | H03M 5/08 323/280 |
| 2016/0373002 A1* | 12/2016 | Borfigat | H02M 1/32 |

* cited by examiner

*Primary Examiner* — Adolf D Berhane
(74) *Attorney, Agent, or Firm* — Finnegan, Henderson, Farabow, Garrett & Dunner, LLP

(57) ABSTRACT

A controller controls a circuit that provides a variable current to a load and provides a constant voltage to the load. The controller controls switches to adaptively respond to a change in a load current by transitioning into or out of pulse-skipping mode.

24 Claims, 7 Drawing Sheets

ADAPTIVE REGULATOR CONTROL FOR VARIABLE LOAD

FIELD OF INVENTION

The invention relates to providing electrical power, and in particular, to the use of a switching regulator to provide electrical power.

BACKGROUND

Devices that rely on digital electronics are particularly fastidious about their demands for a steady voltage. A flashlight will dim or brighten with variations in voltage. But it will still work. Digital devices do not have this property. If the voltage is too high or too low, a processor does not speed up or slow down; it simply ceases to operate.

As a result of this need for a stable voltage, many such devices have a voltage regulator. In this case, the device becomes the load for the voltage regulator.

A typical regulator achieves a steady voltage by rapidly opening and closing switches between its load and an energy source. A feedback system monitors the regulator's output voltage and either raises or lowers the switch's duty cycle in an effort to peg that voltage to precisely the value demanded by the load.

Current, however, is different. Unlike its demand for a steady voltage, a device's demand for current is considerably more fickle. There are times during operation when the digital device will demand very little current, and other times when it demands considerable current.

An example is a display. If the display is dim, only a small amount of current is required. But if a user brightens a display, more current will be required. Another example is a transceiver, which periodically requires large amounts of current to support transmission.

It is possible to operate the regulator so that it always makes available enough current to satisfy a device's heaviest demands for current that the device. But this has drawbacks.

SUMMARY

The invention features a regulator that adapts its operation to support the variable demands of a load.

In one aspect, the invention features a controller that causes switches to adaptively respond to a change in a load current, the load current being a current that is drawn by a load at an output of a circuit that includes an inductor. The controller controls the switches to reduce a difference between an output voltage at the output and a target voltage. During an on-time, current flows through the inductor. During an off-time, current does not flow through the inductor. The controller causes the circuit to transition between a pulse-skipping mode, which has conducting cycles and blank cycles, and a continuous-conduction mode, which has no blank cycles. Both kinds of cycles, namely the blank cycles and the conducting cycles, have a duration that is equal to a cycle period. During a first conducting cycle, there exists a first error. During a second conducting cycle that follows the first conducting cycle, there exists a second error. The first error is based on a comparison between an on-time for the first conducting cycle and the cycle period. The second error a difference between an on-time for the second conducting cycle and the cycle period. The controller operates the switches to cause the second error to be less than the first error.

In some embodiments, the controller reduces the difference based at least in part on a signal that is indicative of a direction of flow of inductor current.

In other embodiments, for each of a plurality of cycles, the controller compares the on-time with the cycle period and outputs a fitting signal indicating that the on-time fails to fill the cycle period.

In yet other embodiments, the controller maintains a value indicative of an extent to which the on-time has failed to fill the cycle period.

Also among the embodiments are those in which the controller outputs a voltage whose value is indicative of an extent to which the on-time has failed to fill the cycle period.

Some embodiments include a controller having a time comparator that receives a first clock signal and derives therefrom a second clock signal. Clock pulses from the second clock signal occur too early, by a predetermined amount, to match clock pulses from the first clock signal.

In other embodiments, the controller includes a time comparator that is configured to receive, for each cycle, a first signal and a second signal. The first signal indicates a start of an on-period for the cycle and a second signal indicates a change in direction of inductor current during the cycle.

Still other embodiments are those in which the controller includes a delay-lock loop connected to reset an edge detector. In such embodiments, the edge detector receives a signal indicative of a start of an on-period. The edge detector's output connects to a data input of a flip-flop. The flip-flop receives a signal indicative of a reversal in the direction of the inductor current. Based at least in part on this signal, the flip-flop outputs a signal indicative of an absence of equality between the cycle period and the on-time.

In some embodiments, the inductor connects to a capacitor at a node and the load connects across the capacitor. In a first switch configuration, a first switch is closed and a second switch is open, thus permitting current to flow from a power source through the inductor. In a second switch configuration, the first switch is open and the second switch is closed. This second configuration permits current to flow to away from the load.

In other embodiments, a first switch connects the inductor to a first potential and a second switch connects the inductor to a second potential lower than the first potential. The controller is configured to open the second switch when the first switch is closed and to also open the second switch when the first switch is open and rate of change of current through the inductor changes sign.

In other embodiments, a first one of the switches connects the inductor to a first potential and a second one of the switches connects the inductor to a second potential lower than the first potential. In these embodiments, the controller causes the first switch and the second switch to operate in response to a clock signal having missing clock pulses.

In other embodiments, the controller causes one switch to cease conducting and another to begin conducting and to do so based at least in part on a relationship between current through the inductor and a difference between the output voltage and the target voltage. These two switches alternately connect the inductor to corresponding first and second potentials. Among these are embodiments in which this difference is one that has been modified by an RC circuit.

In other embodiments, the controller includes a pulse inhibitor that selectively causes execution of blank cycles. Among these embodiments are those in which the pulse inhibitor selectively causes execution of a blank cycle based on a relationship between first and second quantities. The first quantity, in these embodiments, is a voltage indicative of the difference between the output voltage and the target voltage and second quantity is a voltage that depends on the first and second errors. However, in others of these embodiments, wherein a current through the load includes pulses, each of which includes a ramp-up portion and a ramp-down portion. These last for a ramp-up time and a ramp-down time respectively. the ramp-up time, current increases to a peak current whereas during the ramp-down time, current decreases from the peak current. In these embodiments, the pulse inhibitor selectively causes execution of a blank cycle based at least in part on the ramp-up time and the ramp-down time.

Also among the embodiments are those in which a comparator provides, to one input of an AND gate, a signal that depends at least in part on the difference, the first and second error, and a clock provides, to an other input of the AND gate, a clock signal that includes first and second clock pulses pulse. In these embodiments, the AND-gate provides a signal that prevents the first switch from changing state upon occurrence of the first clock pulse and permits the first switch to change state upon occurrence of the second clock pulse.

Other embodiments include a current sensor that provides a signal indicative of current through the inductor. In these embodiments, controller controls the first and second switches based at least in part on a signal that is indicative of current through the inductor. One source of such a signal is a suitable current sensor.

In other embodiments, the controller causes the circuit to transition between a pulse-skipping mode and a continuous-conduction mode in response to a change in the load current.

In yet other embodiments, the controller causes a transition into pulse-skipping mode in response to information indicating that load current has fallen below a threshold and then cause a transition into continuous-conduction mode in response to information indicating that load current has risen above that threshold.

In another aspect, the invention features an apparatus that includes switches and a controller that controls the switches to reduce a difference between the regulator's output voltage and a target voltage in response to a change in a current drawn by a regulator that comprises an inductor. The controller is configured to transition the regulator between first and second modes. The first mode consists of conducting cycles, during which the inductor carries current, and blank cycles, during which the inductor carries no current. The second mode consists of only the conducting cycles. The conducting cycles and the blank cycles each having a duration equal to a cycle period. The controller controls the switches such that current only flows through the inductor during successive on-times and does so in such a way that, during operation, it progressively reduces errors that are based on a comparison between the cycle period and the successive on-times.

In some embodiments, the regulator comprises a buck converter.

In other embodiments, the switches comprise a first switch that connects the inductor to a power source and a second switch that connects the inductor to ground. In such embodiments, the controller opens the second switch when the first switch is closed and closes the second switch when both the first switch is open and a rate of change of current through the inductor changes sign.

In yet other embodiments, a first switch connects the inductor to a power source and a second switch connects the inductor to ground. In these embodiments, the controller causes the first switch and second switches to operate in response to a clock signal in which consecutive clock pulses are separated by different durations of time.

Still other embodiments include a pulse inhibitor that selectively causes execution of blank cycles.

In another aspect, the invention features an apparatus having a first switch, a second switch, and a controller that causes a regulator to adaptively transition between a pulse-skipping mode and a continuous-conduction mode in response to changes in load current at an output of the regulator. The first and second switches are controlled by the controller and coupled to an inductor within the regulator. The controller controls the first and second switches so as to reduce a difference between an output voltage at the output and a target voltage. As a result of controlling the switches, the controller selectively disconnects the inductor from a power source. The controller receives information that is indicative of a current through the inductor and causes the transition between the pulse-skipping mode and the continuous-conduction mode to occur at least in part based on this information.

In some embodiments, the first switch connects the inductor to a power source and the controller is configured to cause the first switch to remain closed for at least a specified minimum time.

Embodiments include those in which the information comprises information indicative of a direction of the current and those in which the information comprises a drive signal for driving a switch that connects the inductor to a power source.

In some embodiments, the first switch connects the inductor to a power source and the controller causes the first switch to remain closed for at least as long as current through the inductor is below a predetermined value.

Also among the embodiments are those in which the first switch connects the inductor to a power source and the second switch emulates a diode that connects the inductor to ground.

These and other features of the invention will be apparent from the following detailed description and its accompanying drawings, in which:

DETAILED DESCRIPTION

Figure 1:
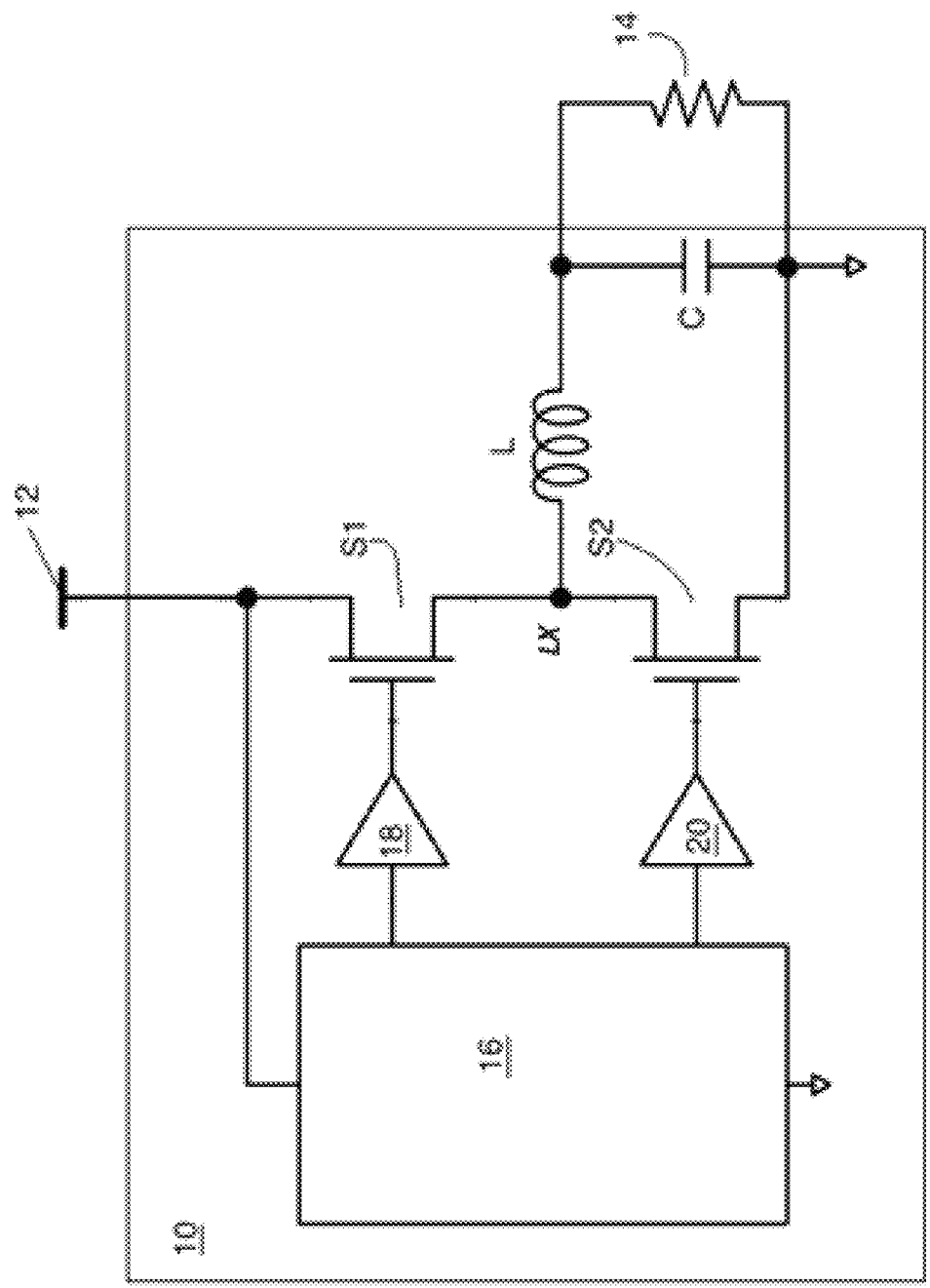
FIG. 1 shows a regulator.

FIG. 1 shows a regulator 10 that has a regulator input connected to a power source 12. The regulator's output connects to a load 14. A controller 16 controls the regulator 10 in an effort to cause an output voltage at the regulator's output to match a target voltage. The controller 16 also attempts to meet the load's demand for a load current.

To control both the output voltage and the load current, the controller 16 controls the regulator's first and second switches S1, S2 by providing control signals to corresponding first and second drivers 18, 20.

The control signals cause the first and second switches S1, S2 to vary in resistance. When a switch is in its "open" state, it has a first resistance. When a switch is in a "closed" state it has a second resistance. The second resistance is greater than the first resistance. A switch in its "open" state is often referred to as being "off" or "turned off." A switch in its "closed" state is often referred to as being "turned on."

The regulator 10 also includes a capacitor C. The output voltage, which is across the capacitor C is generally stable. However, the output current varies depending on the load's demand.

The regulator 10 also includes an inductor L. In the illustrated embodiment, the inductor L connects an anode of the capacitor C to an inductor node LX that lies on a current path between the first and second switches S1, S2.

The regulator 10 shown in FIG. 1 happens to be a buck converter. However, the principles described herein are applicable to other kinds of regulators that use a pair of switches to regulate power provided to a variable load 14.

The regulator's first and second switches S1, S2 can be in one of four switch-configurations.

In a first switch-configuration, the controller 16 closes the first switch S1 and opens the second switch S2. The sudden surge of current induces a voltage across the inductor L with a polarity that promotes this current surge.

This current, referred to herein as the "inductor current," is related to the load current. A positive inductor current flows from the inductor node LX towards the regulator's output. A negative inductor current flows from the regulator's output towards the inductor node LX.

The first switch-configuration causes the output current to grow. This will be approximated herein as an upwardly sloping ramp of inductor current. The controller 16 maintains the first switch-configuration for a time referred to wherein as the "ramp-up time." At the end of this ramp-up time, the inductor L will have reached a value referred to herein as "peak inductor-current."

In a second switch-configuration, the controller 16 opens the first switch S1 and closes the second switch S2. This disconnects the power source 12 from the inductor L. This sudden loss of current induces another voltage across the inductor L. The polarity of this induced voltage tends to suppress the inductor current. In this second switch-configuration, the output current decays. This will be approximated herein as a downwardly sloping ramp in the inductor current. The controller 16 maintains the second switch-configuration for a duration that is referred to herein as the "ramp-down time."

The ramp-up time and the ramp-down time together define an inductor current that, when viewed as a function of time, approximates a triangle. The triangle's height is the peak inductor-current. The duration of its base is the sum of the ramp-up time and the ramp-down time. This sum of ramp-up time and ramp-down time is referred to herein as the "on-time."

The area under the curve, which is approximately the area of this triangle, is the amount of charge delivered to the load 14 during the first and second switch-configurations. This charge, when divided by the duration of the triangle's base, represents the average current.

In a third switch-configuration, the controller 16 opens the first and second switches S1, S2. This results in no output current. The time during which the regulator 10 is in this third switch-configuration will be referred to herein as the "off-time."

A fourth switch-configuration features closed first and second switches S1, S2. This fourth switch-configuration would only occur during a serious malfunction. It results in a short circuit that will lead to uncomfortably high current.

It is understood that each transition from one switch configuration to another, the controller 16 inserts a brief dead time during which it opens the first and second switches S1, S2. This corresponds to the third configuration. The controller 16 does so because the exact time at which a switch S1, S2 changes state cannot be controlled with infinite precision. The controller 16 inserts a dead time to reduce the risk of having the fourth switch-configuration occur, even momentarily. To avoid complexity in the following discussion, this dead time shall be ignored.

The controller 16 causes the regulator 10 to repeatedly execute cycles. Each cycle lasts for one "cycle period." This cycle period remains fixed throughout operation. As a result, controlling the peak inductor-current controls the average current.

The number of cycles that occur per unit time is called the "cycle frequency." During each cycle, the controller 16 causes one or more switch configurations to occur.

The controller 16 implements two kinds of cycles: "conducting cycles" and "blank cycles." A conducting cycle is one that has non-zero inductor current for at least part of the cycle. A conducting cycle must therefore have at least one of the first and second switch-configurations. A blank cycle is one in which inductor current remains zero throughout the cycle. A blank cycle therefore includes only the third switch-configuration.

A particular combination of cycles is referred to herein as an "operating mode." An "operating mode" comprises different kinds of "cycles." Each "cycle" comprises different kinds of "switch configurations." The controller 16 as described herein chooses the operating mode and selects the nature of the cycles and the switch configurations within the cycles. The controller 16 does so in an adaptive manner based at least in part on variations in the load current in an effort to strike a balance between excessive switching losses during the tenure of a particular operating mode and excessive jitter during transition between operating modes.

Three operating modes are available: a continuous-conduction mode, a discontinuous conduction mode, and a pulse-skipping mode.

In a continuous-conduction mode, each cycle consists of a first switch-configuration followed by a second switch-configuration. Thus, each cycle takes the form (01 10). However, the ramp-up time and the ramp-down time do not have be equal or even the same from one cycle to the next. Instead, the controller 16 adaptively controls these times based on the required load current.

In a discontinuous-conduction mode, the regulator sometimes stops the load current. This mode is like the continuous-conduction mode except that a third switch-configuration follows the second switch-configuration. Each thus cycle takes the form (01 10 00). However, the ramp-up time, the ramp-down time, and the off-time do not have be equal or even the same from one cycle to the next. Instead, the controller 16 adaptively controls these times based on the required load current.

The foregoing modes feature only conducting cycles. However, the controller 16 can also intersperse one or more blank cycles between conducting cycles. The resulting operating mode is a "pulse-skipping mode." Pulse-skipping mode is particularly useful when operating with a load 14 that draws little current. The other two operating modes are useful for operating with a load 14 that draws more current.

Figure 2:
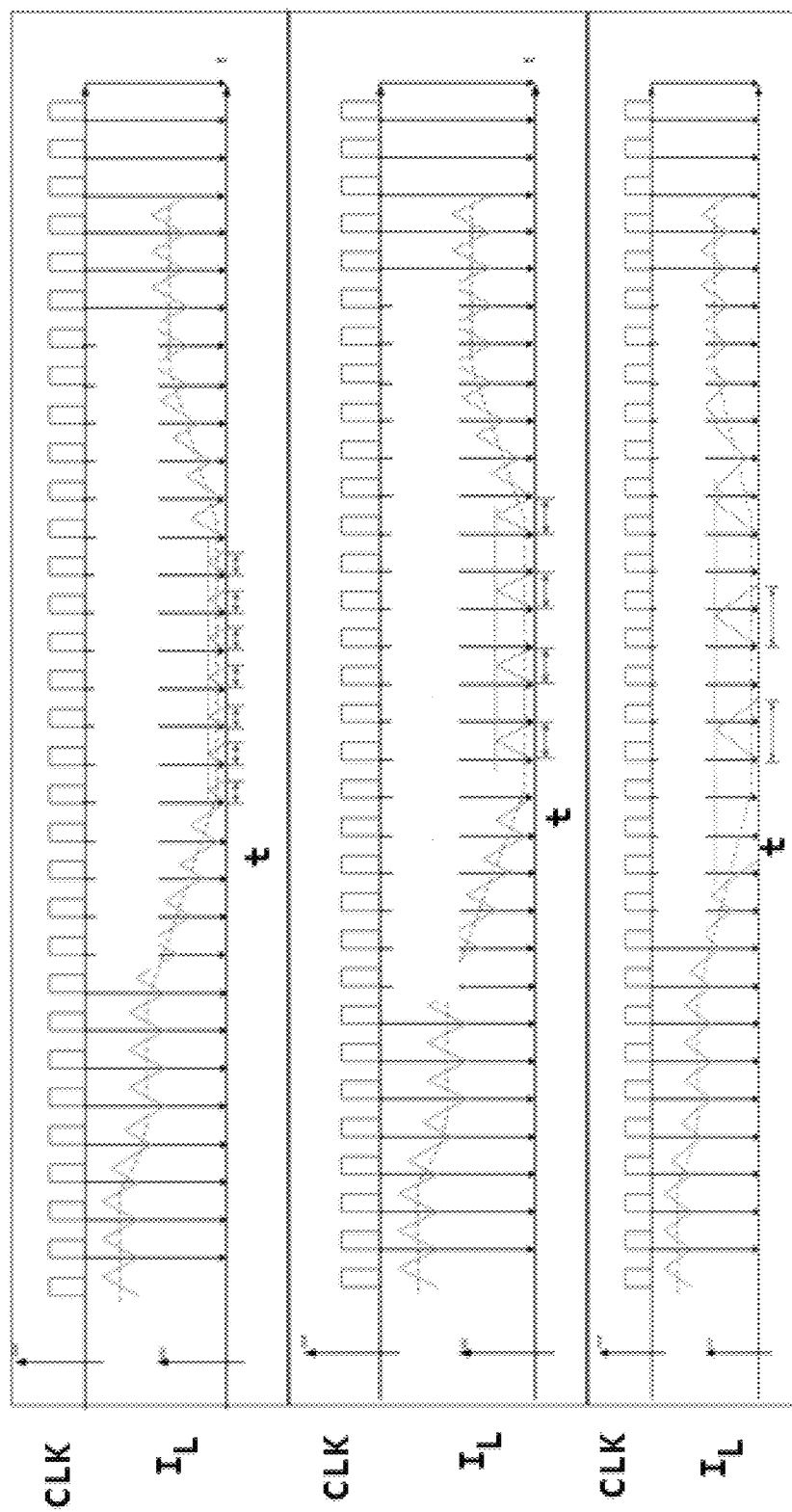
FIG. 2 shows different operating modes for the regulator in FIG. 1.

FIG. 2 illustrates graphs showing different operating modes.

At the top of each graph is a pulse train that sets the cycle period. This cycle period remains constant throughout operation.

Each graph shows a dashed line that represents the current that the load 14 draws at any instant. As can be seen, this load current decreases to a minimum, stays at that minimum for some time, and then increases again. This might occur, for example, if a user reduces the brightness on his display.

Each graph also shows the inductor current. As shown in the graph, the controller 16 varies the ramp-up time and the ramp-down time in an effort to cause an average inductor-current to track the load current. The capacitor C provides charge to account for any mismatch.

As can be seen in each graph, the controller 16 adaptively increases the ramp-up time at the expense of the ramp-down time. Thus, as the load current drops, the controller 16 extends the ramp-down time at the cost of the ramp-up time, thereby reducing the inductor current so that it tracks the falling load current. Eventually, the load current drops far enough so that the controller 16 transitions into a pulse-skipping mode. It operates in a pulse-skipping mode until the load current starts to rise. At some point, the controller 16 transitions out of pulse-skipping mode. As load current increases, the controller 16 adaptively controls the ramp-up time and the ramp-down time, thereby increasing the average inductor-current so that it can track the load current.

As can be seen in FIG. 2, the different pulse-skipping modes differ in their peak inductor-currents and in the number of switching events. The greater the peak inductor-current, the fewer switching events occur.

The choice of which of these pulse-skipping modes to use affects the overall efficiency of the regulator 10 as well as on the smoothness of the transition into and out of pulse-skipping mode. A voltage ripple at the regulator's output provides an observable manifestation of the smoothness of this transition.

A first type of pulse-skipping mode features the same cycle used in the discontinuous-conduction mode but interspersed with one or more blank cycles. This has the lowest peak inductor-current of all. But there are also more switching events. Thus, this type of pulse-skipping mode is prone to switching loss.

A second type of pulse-skipping mode features the same cycle used in the continuous-conduction mode but interspersed with one or more blank cycles. This second type has a higher peak inductor-current but fewer switching events.

A third type of pulse-skipping mode has successive conducting cycles interspersed with one or more blank cycles. This third type has the highest peak inductor-current and hence the fewest switching events. However, this comes at a cost of a jittery transition into and out of pulse-skipping mode.

The controller 16 as described herein implements the second type of pulse-skipping mode. This mode offers a good compromise between switching loss and a graceful transition. This second type of pulse-skipping mode will herein be referred to as "critical-conduction mode." Its operation is characterized by having conducting cycles in which the ramp-up time and the ramp-down time sum to the cycle period. Thus, the controller 16 only puts the first and second switches S1, S2 into the third configuration during a blank cycle.

Operating in critical-conduction mode requires knowing the peak inductor-current. A formula exists for calculating the peak inductor-current based on various circuit parameters. These circuit parameters include the inductance of the inductor L, the cycle frequency, the input voltage, and the output voltage. However, this formula is difficult to implement. One reason is that, because of manufacturing variations, the inductance may vary significantly from one regulator 10 to the next. It also varies significantly with temperature. This poses a difficulty for the controller 16 because it would not be able to reliably calculate a required peak inductor-current.

Figure 3:
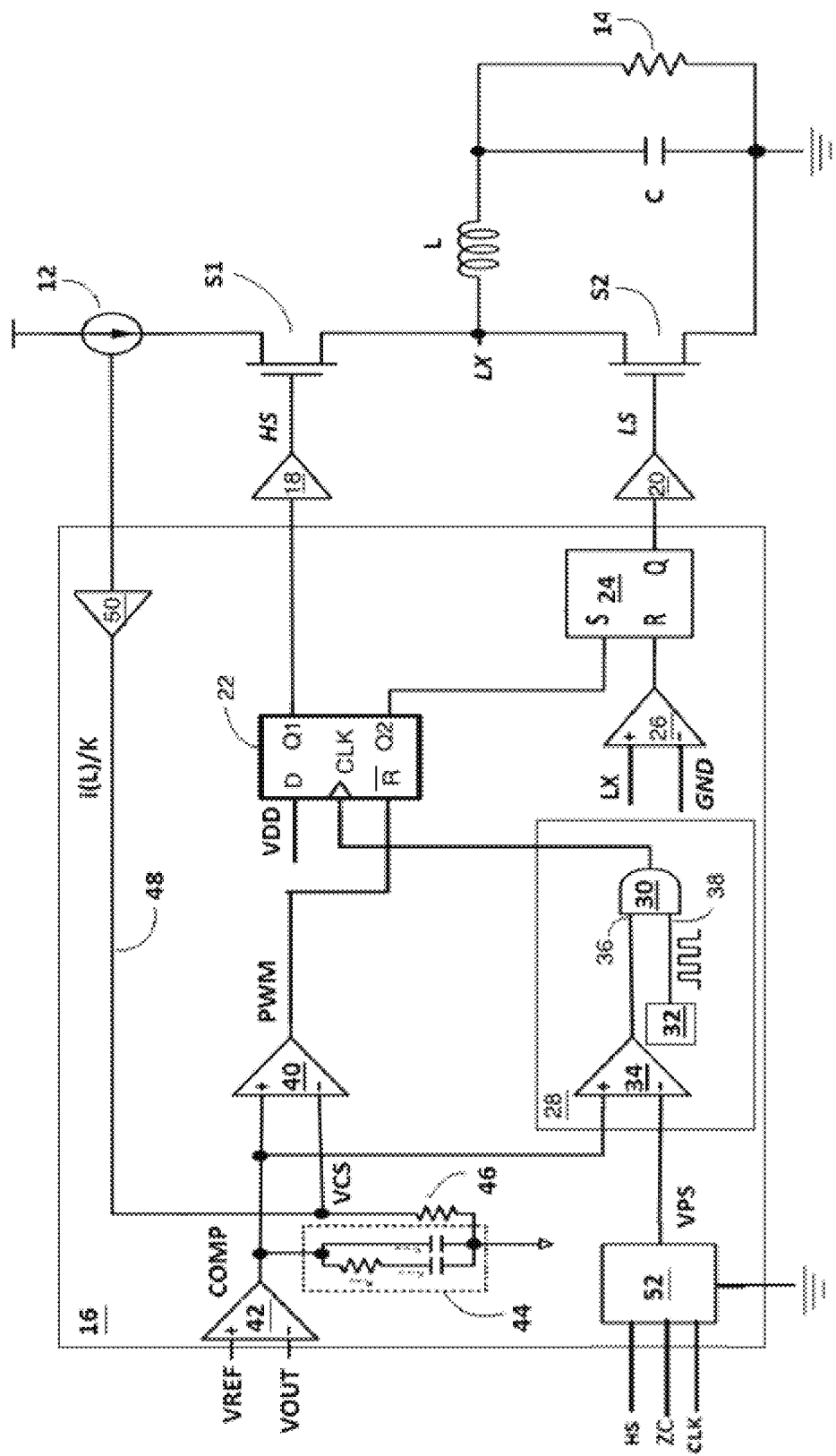
FIG. 3 shows details of the controller shown in FIG. 1.

As shown in FIG. 3, the controller 16 features a first D-flip-flop 22 and an SR-flip-flop 24.

The first D-flip-flop 22 ultimately controls whether the first switch S1 is open or closed. The SR-flip-flop 24 ultimately controls whether the second switch S2 is open or closed.

Logic circuitry upstream of the first D-flip-flop 22 and the SR-flip-flop 24 controls the states of both flip-flops 22, 24 based on measurements indicative of circuit operation. These permit the controller 16 to transition between operation-modes based on load current and to control the details of the cycles within the operating modes.

The first D-flip-flop 22 has a first output Q1, a second output Q2, a clock input CLK, a data input D, and an inverting reset input REAR.

The first output Q1 corresponds to the flip-flop's state, which is either logical "one" or logical "zero." The second output Q2 is logical "zero" when the first output Q1 is logical "one" and logical "one" when the first output Q1 is logical "zero."

The data input D, when presented with a logical "one," causes the first D-flip-flop 22 to transition into a set state at the next instant that a logical "1" at the clock input CLK permits such a transition. As shown in the figure, data input D connects to a supply voltage VDD.

The reset input REAR, upon receiving a logical "zero," causes the first output Q1 to immediately transition to logical "S." This occurs based on how much inductor current is flowing and on how far off the regulator's output voltage is from a target output voltage.

The SR-flip-flop 24 has an output Q, a set input S, and a reset input R. The output Q is the state of the SR-flip-flop 24. A logical "one" presented to the set input S causes the output Q of the SR-flip-flop 24 to be at logical "one." A logical "zero" presented to the reset input R causes the output Q of the SR-flip-flop 24 to be at logical "zero."

The first output Q1 of the first D-flip-flop 22 connects to the first driver 18. This first driver 18 provides a high-side drive signal HS that drives the first switch S1. The output Q of the SR flip-flop 24 connects to the second driver 20. This second driver 20 provides a low-side drive signal LS that drives the second switch S2. The second output Q2 of the first D-flip-flop 22 connects to the set input S of the SR flip-flop 24. This ensures that the second switch S2 can only close if the first switch S1 is open.

The reset input R of the SR-flip-flop 24 receives a flow-direction signal indicative of which way current is flowing through the second switch S2. The flow-direction signal is a binary signal that changes state when current flowing through the second switch S2 changes direction. In particular, the flow-direction signal assumes a first state when current flows through the second switch S2 towards the inductor node LX and a second state when the current flows through the second switch S2 from the inductor LX towards ground.

When in the first state, the flow-direction signal keeps the second switch S2 closed. When in the second state, the flow-direction signal causes the second switch S2 to open.

The net effect is that the second switch S2 permits current to flow from ground but prevents current from flowing the other way.

In some embodiments, the reset input R of the SR-flip-flop 24 connects to a first comparator 26 that outputs a flow-direction signal whose value is indicative of the voltage between ground and the inductor node LX between the first and second switches S1, S2. This causes the first comparator 26 to output a digital value that depends on the sign of the voltage. The sign of the voltage indicates the direction of current and thus provides the basis needed to determine whether the second switch S2 should be opened. In effect, this causes the second switch S2 to emulate a diode.

The output of the first comparator 26 is changed to a logical "one" when the second switch S2 is closed and when the decay in inductor current approaches zero. This is manifested by detecting that the difference between the voltage at the inductor node LX and the ground voltage is close to changing sign. This change causes the second switch S2 to open and also indicates the end of its on-time.

The output Q of the SR-flip flop 24 is set to a logical "0" when the first switch S1 closes. It is then set to logical "1" when the first switch S1 opens and reset to logical "0" by a logic "1" that comes from the comparator 34.

The controller 16 includes a pulse inhibitor 28 that provides an irregular clock signal to the clock input CLK of the first D-flip-flop 22. This pulse inhibitor 28 is what causes the regulator 10 to ultimately transition into a pulse-skipping mode. This irregular clock signal permits insertion of blank cycles during pulse-skipping mode.

The pulse inhibitor 28 features an AND-gate 30, a clock 32, and a second comparator 34.

The AND-gate 30 has first and second AND-gate inputs 36, 38. The clock 32 provides a regular clock signal to the second AND-gate input 38. This regular clock signal is at the cycle frequency.

The second comparator 34 has a positive input and a negative input. The positive input receives a filtered voltage-error signal that is indicative of a difference between a target voltage and a measured regulator's output voltage. The negative input receives an output signal from a peak-current estimator 52. This signal is indicative of the peak inductor-current. As noted above, this peak inductor-current is the value of inductor current at the end of the ramp-up time and the beginning of the ramp-down time.

The first AND-gate input 36 receives a suppression signal from the second comparator 34. The suppression signal is a logic signal whose value indicates whether conditions are ripe for having a blank cycle. The second comparator 34 provides the suppression signal based on a comparison between signals presented at positive and negative inputs thereof. These signals are discussed further below.

The pulse-inhibitor 28 thus passes a clock pulse to the CLK input only if the suppression signal from the second comparator 34 does not inhibit that clock pulse. Otherwise, the suppression signal causes the signal received at the CLK input to skip a clock pulse, thereby inserting a blank cycle.

A third comparator 40 provides a logical output indicative of a relationship between voltage error at the regulator's output and the peak inductor-current. This logical output ultimately reaches the reset input R of the first D-flip-flop 22. A logical "one" from the third comparator 40 thus opens the first switch S1 and closes the second switch S2. This event occurs based on a relationship between the inductor current, which is related to the load current, a target voltage VREF, and the regulator's output-voltage.

The third comparator's positive input connects to a filtered version of an output COMP of a fourth comparator 42, which likewise receives signals at positive and negative inputs thereof and provides an output indicative of which is the greater of the two signals. In the illustrated embodiment, the fourth comparator 42 is implemented as an amplifier that outputs an analog output.

This fourth comparator 42 receives the target voltage VREF at its positive input and a measurement of the regulator's output-voltage VOUT at its negative input. The output COMP of the fourth comparator 42 therefore amounts to a voltage-error signal that can be used as a basis for feedback correction.

This voltage-error signal COMP, however, is prone to changing sign frequently. To avoid excessive jitter, it is useful to pass the voltage-error signal through an RC filter 44 to generate an inherently more stable filtered voltage-error signal. It is this filtered voltage-error signal that ultimately reaches the positive input of the third comparator 40 as well as the positive input of the second comparator 34.

The negative input of the third comparator 40 receives an inductor-current voltage VCS that depends on the inductor current that flows while the first switch S1 remains closed. This would be related to the load current. The inductor-current voltage VCS is measured from a point just above a resistor 46 along a path 48 through which a current-sensing amplifier 50 sends a current that depends on the inductor current.

Because it relies on the inductor current, which is related to load current, the third comparator 40 provides a basis for controlling the ramp-up time and the ramp-down time during a conducting cycle. This provides a way to ensure that the sum of these times is equal to the cycle period. Because of its reliance on the difference between the regulator's output voltage and a target voltage, the comparator 40 also provides a basis for regulating the output voltage.

The third comparator's negative input receives a pulse-skipping voltage VPS from the output of the adaptive peak-current estimator 52. This pulse-skipping voltage is related to the peak inductor-current. In the illustrated embodiment, the pulse-skipping voltage VPS is proportional to the peak inductor-current with a constant of proportionality being an equivalent inductance per unit time.

Figure 4:
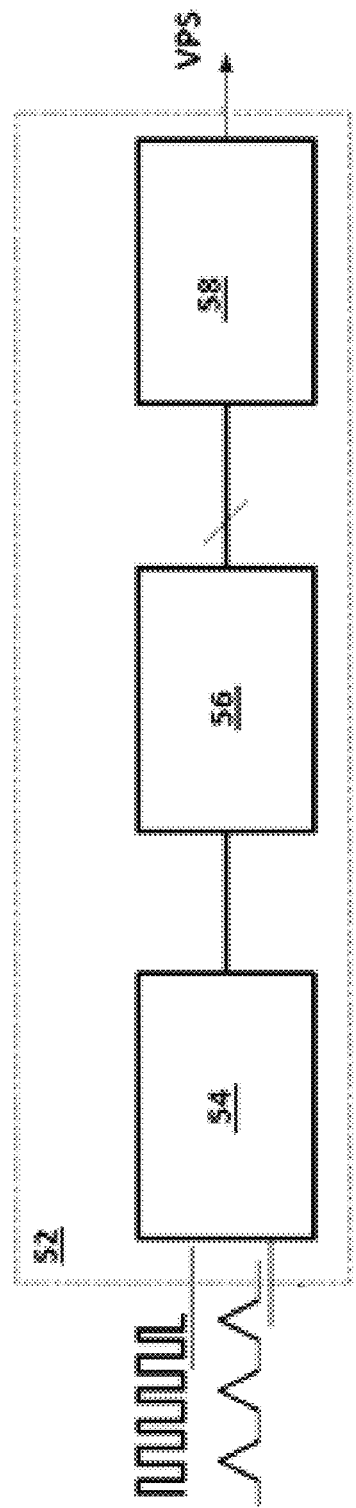
FIG. 4 shows details of the peak-current estimator shown in FIG. 3.

As shown in FIG. 4, the peak-current estimator 52 includes a timing comparator 54 that receives the regular clock signal from the clock 32 and information indicative of the inductor current. Such information includes, for example, whether the inductor current is increasing or decreasing. FIG. 3 shows a particular embodiment in which the information indicative of the inductor current is the high-side drive signal HS.

Figure 6:
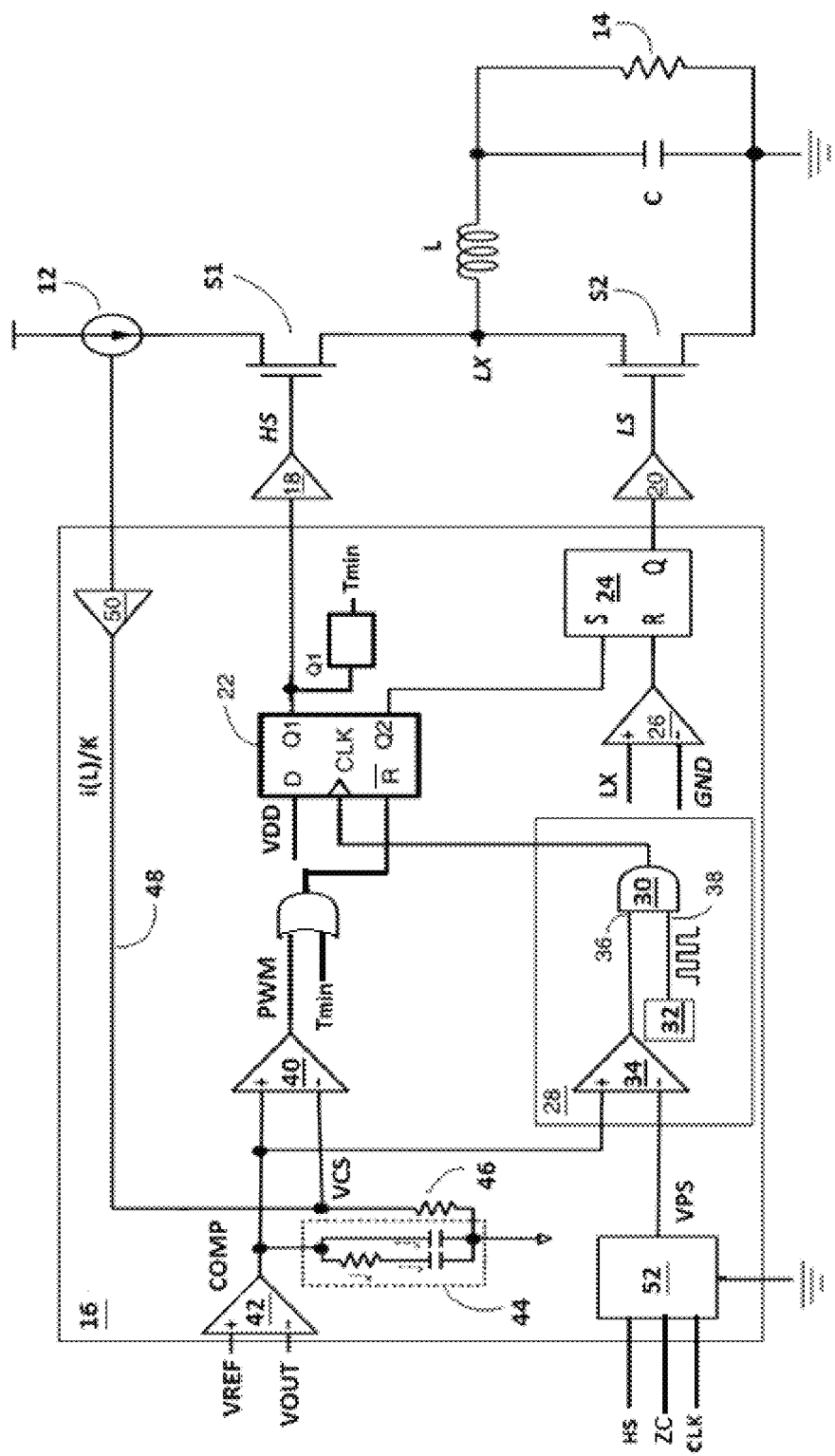
FIGS. 6 and 7 show alternative embodiments of the controller shown in FIG. 1

In another embodiment, as shown in FIG. 6, the ramp-up time, during which the first switch S1 is closed, is constrained to avoid falling below a particular fixed value THIN.

Figure 7:
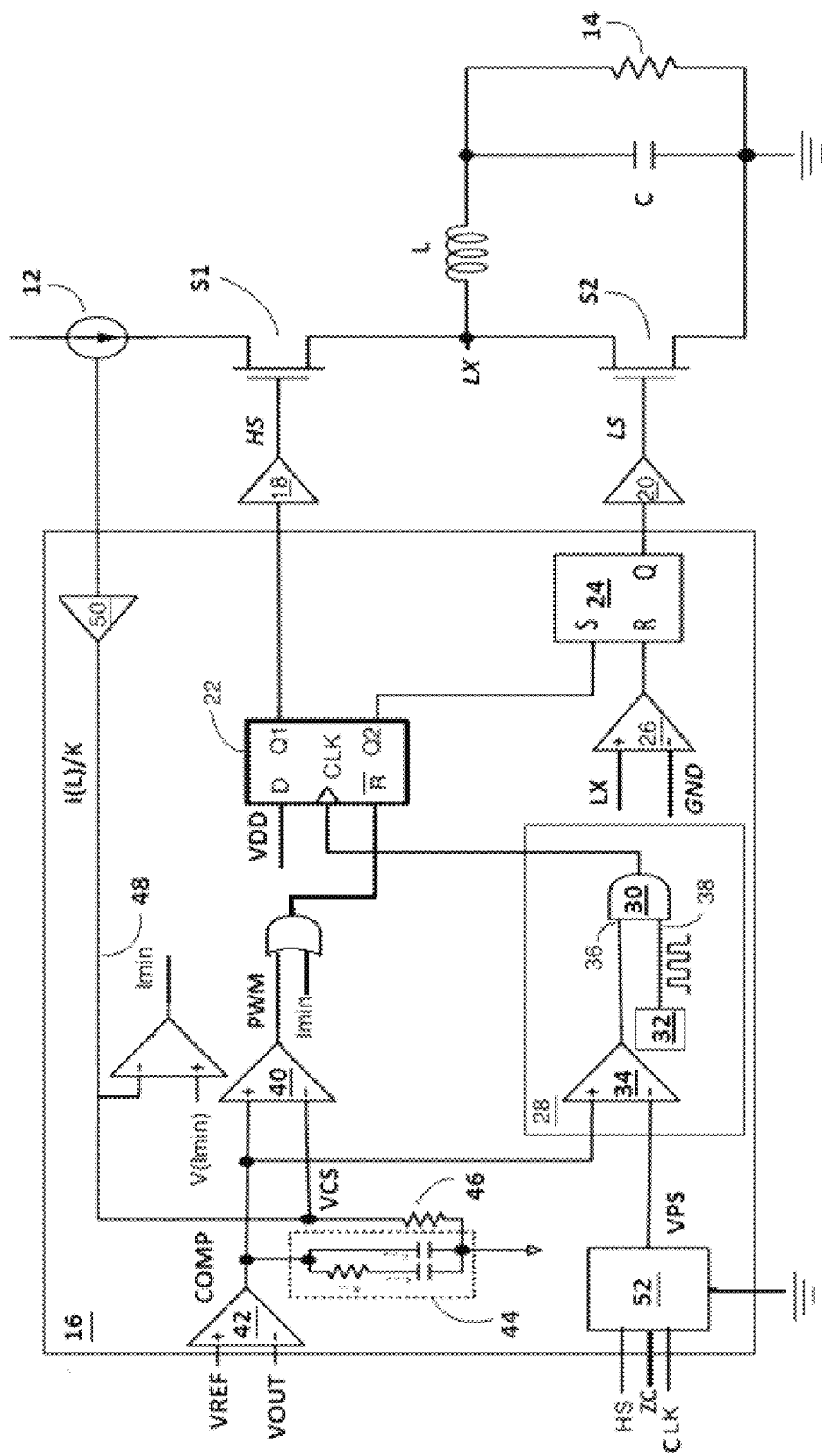

In yet another embodiment, as shown in FIG. 7, the ramp-up time lasts for as long as the current is below some fixed value IMIN.

The timing comparator 54 outputs a signal that depends on whether or not the on-time observed from the inductor current matches the cycle period as observed from the clock signal. If the on-time falls short of the cycle period, the timing comparator 54 outputs a logical "one." This drives the pulse-skipping voltage VPS higher. On the other hand, if the on-time exceeds the cycle period, the timing comparator 54 outputs a logical "zero." This pulls the pulse-skipping voltage VPS lower.

A counter 56 accumulates the individual outputs of the timing comparator 54 over time. The counter 56 thus maintains a running total that indicates how much time the on-time exceeds the cycle period. The counter 56 provides this running total to a D/A converter 58. The D/A converter then outputs an analog voltage that becomes the pulse-skipping voltage VPS. It is this pulse-skipping voltage VPS that passes into the negative input of the second comparator 34.

As a result of the counter's operation, the pulse-skipping voltage stays the same as it was in the preceding cycle if the first switch S1 remains open in the current cycle. If, on the other hand, the first switch S1 closes in the current cycle, there are two possibilities. If, in the cycle that immediately followed the preceding time that the first switch S1 closed, the inductor current changed direction and began to flow away from the first switch S1, the pulse-skipping voltage increases. Otherwise, the pulse-skipping voltage decreases.

Figure 5:
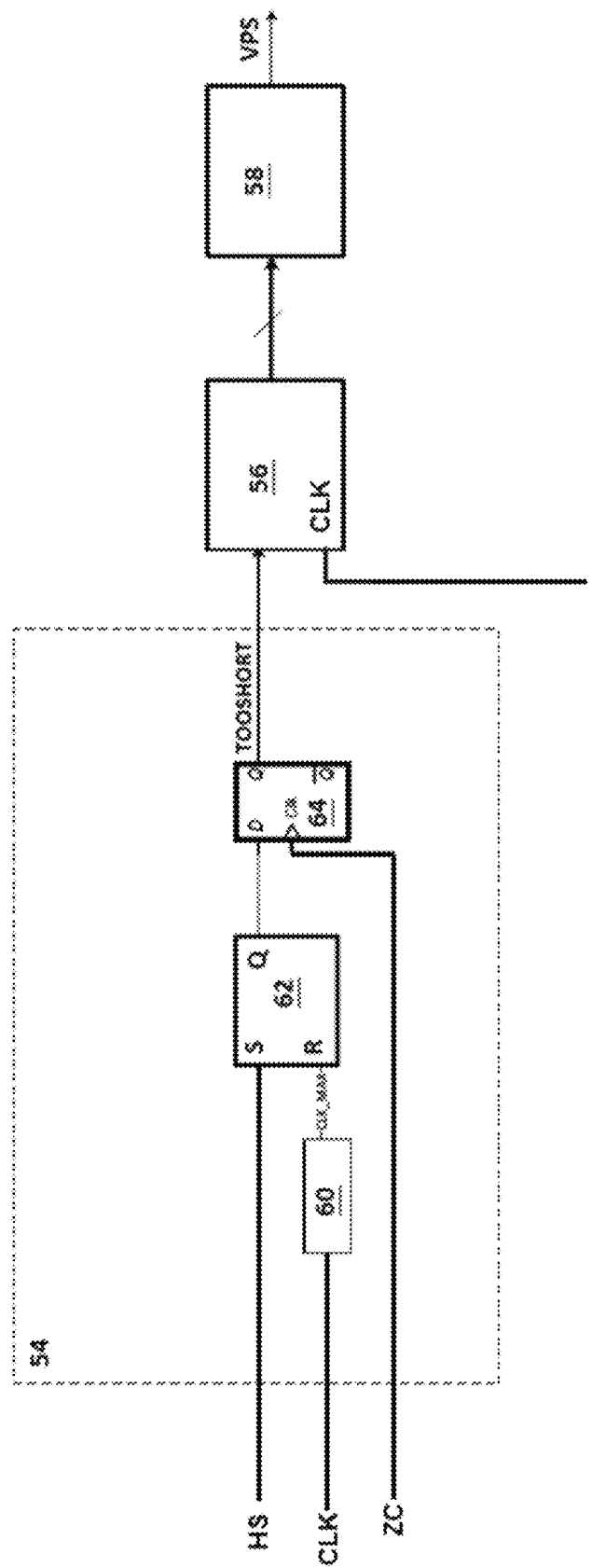
FIG. 5 shows details of the timing comparator shown in FIG. 4.

FIG. 5 shows a timing comparator 54 that includes a delay-lock loop 60 and an edge trigger 62.

The delay-lock loop 60 receives the clock signal CLK and derives, from that clock signal CLK, an anticipatory clock-signal CLK_MAX. The anticipatory clock-signal CLK_MAX is a signal that comprises narrow pulses, each of which marks the end of a clock cycle. Stated differently, each pulse of the anticipatory clock-signal occurs at some predetermined time before the rising edge of the next clock pulse of the clock signal CLK. In some embodiments, the anticipatory clock-signal has pulses that begin upon the lapse of 90% of the cycle period. This anticipatory clock-signal CLK_MAX is what the delay-lock loop 60 provides to a reset input R of the edge trigger 62.

Meanwhile, a set input S of the edge trigger 62 receives a signal that indicates the beginning of the ramp-up time. A suitable signal to provide to the set input S of the edge trigger 62 is the high-side drive signal HS that the first driver 18 uses to close the first switch at the beginning of the ramp-up time.

The output Q of the edge trigger 62 thus transitions into a logical "one" at the beginning of the on-time and transitions into a logical "zero" shortly before the on-time ends, thereby indicating that the first switch S1 is closing A data input D of a second D-flip-flop 64 receives this output. A clock input CLK of the second D-flip-flop 64 receives a set of zero-crossing pulses ZC, each of which occurs when the inductor current begins flowing from the inductor node LX to ground. This coincides with the end of the ramp-down time.

An output Q of the second D-flip-flop 64 carries a fitting signal TOOSHORT to a first input of the counter 56. The fitting signal carries information concerning whether the on-time fits within a cycle period. If the on-time is too short to fill the cycle period, the fitting signal TOOSHORT adopts a first logical value. If the on-time is too long to fit within the cycle period, the fitting signal TOOSHORT adopts a second logical value.

A change in the output of the first comparator 26 to a logical "one" samples the data input D of the second D-flip-flop 64. When the data input D is at a logical "one," the end of the cycle time has not been reached. Therefore, the on-time is less than the cycle time, the pulse-skipping voltage VPS increases. Conversely, when the data input D is at a logical "zero," the end of the cycle time has been passed. This means that the on-time is larger than the cycle time. This means that the pulse-skipping voltage VPS decreases.

Based on the fitting signal TOOSHORT, the counter 56 keeps track of how often the on-time fails to precisely fit the cycle period and how it is failing to fit. The more times the on-time makes the same kind of error, the greater the pulse-skipping voltage VPS will be. The polarity of the pulse-skipping voltage indicates whether the on-time is too short to fill a cycle period or too long to fit within a cycle period. This provides a way to ensure that the on-time exactly fits the cycle period, which is a requirement of critical-conduction mode.

The invention claimed is:

1. An apparatus to receive a first voltage at a first node and to generate a second voltage at a second node, the apparatus comprising:
one or more drivers; and
a controller including a comparator to generate a voltage-error signal based, at least in part, on a difference between an output voltage at the second node and a target voltage,
the controller to further include a peak-current estimator to generate a pulse-skipping voltage based, at least in part, on an estimate of a peak current through an inductor, the estimate isto be based, at least in part, on the voltage-error signal and/or a signal set, the signal set to comprise at least one of the following: a signal indicative of a current through the inductor; one or more timing signals; or any combination thereof,
wherein the one or more timing signals to include at least one pulse signal,
wherein the controller to generate one or more control signals to at least partially control a state change of at least one switch of a plurality of switches so as to reduce the difference between the output voltage at the second node and the target voltage based, at least in part, on the pulse- skipping voltage, and
wherein the controller comprises a pulse inhibitor to selectively implement one or more blank cycles based on an interaction between the voltage-error signal and the one or more timing signals.

2. The apparatus of claim 1, wherein the state change comprises a change from a conducting state to a non-conducting state of the at least one switch.

3. The apparatus of claim 1, and further comprising a current sensor to generate the signal indicative of the current through the inductor.

4. The apparatus of claim 1, wherein the controller comprises a pulse inhibitor to selectively implement one or more blank cycles.

5. The apparatus of claim 4, wherein the one or more blank cycles to be implemented based, at least in part, on a relationship between a voltage indicative of the difference between the output voltage and the target voltage and a voltage that depends on a first and a second error.

6. The apparatus of claim 1, wherein the signal indicative of the current through the inductor comprises a high-side drive signal.

7. The apparatus of claim 1, wherein the controller to generate the one or more control signals to at least partially control the state change of at the least one switch in response to a change in a current through the inductor.

8. The apparatus of claim 1, wherein the at least one pulse signal comprises a plurality of pulses, a particular pulse of the plurality of pulses to comprise a ramp-up portion and a ramp-down portion of the at least one pulse signal.

9. The apparatus of claim 8, wherein during the ramp-up portion the current through the inductor is to increase to the peak current, and wherein during the ramp-down portion the current through the inductor is to decrease to be below the peak current.

10. The apparatus of claim 9, wherein the controller to implement a blank cycle based, at least in part, on the ramp-up portion and the ramp-down portion.

11. The apparatus of claim 1, wherein the one or more control signals to be provided to transition between a critical conduction mode and a continuous-conduction mode.

12. The apparatus of claim 1, wherein the peak-current estimator comprises a timing comparator to receive a regular clock signal and information indicative of the peak current through the inductor.

13. The apparatus of claim 12, wherein the timing comparator to output a signal to influence the pulse-skipping voltage based on a comparison between information indicative of the peak current through the inductor and the regular clock signal.

14. A controller to provide one or more control signals to one or more drivers to operate of a plurality of switches of a regulator so as to reduce an error between an output voltage of the regulator and a target voltage, the controller comprising:
a clock to generate a timing signal;
a peak-current estimator and an amplifier, the amplifier to provide an error signal to facilitate a feedback correction to be used, at least in part, to reduce the error between the output voltage of the regulator and the target voltage; and
a pulse inhibitor to selectively implement one or more blank cycles based on an interaction between a voltage-error signal and the timing signal, wherein the peak-current estimator to receive a signal set comprising one or more of: a signal indicative of a direction of flow of inductor current; a first timing signal; or a second timing signal, and to estimate a pulse-skipping voltage based, at least in part, on the signal set, and
wherein the peak-current estimator to output the estimated pulse-skipping voltage to be used, at least in part, by the controller to estimate a minimum duration of time so as to keep at least one switch of the plurality of switches in a conducting state to facilitate a critical conduction mode of the regulator.

15. The controller of claim 14, wherein the at least one switch of the plurality of switches to be kept in the conducting state while the inductor current is below a predetermined value.

16. The controller of claim 14, wherein the regulator comprises a buck converter.

17. The controller of claim 14, wherein the one or more control signals to be provided to transition between the critical conduction mode and a continuous-conduction mode.

18. The controller of claim 15, wherein the one or more control signals to facilitate the transition into the critical conduction mode based, at least in part, on a load current being below a predetermined threshold.

19. The controller of claim 15, wherein the one or more control signals to facilitate the transition into the continuous-conduction mode based, at least in part, on a load current being at or above a predetermined threshold.

20. A method comprising:
receiving one or more input signals comprising at least one of the following: a high-side drive signal indicative of a current through an inductor; one or more timing signals; or any combination thereof;
estimating a pulse skipping voltage based, at least in part, on the one or more input signals;
determining a peak inductor-current based, at least in part, on the pulse skipping voltage;
estimating a minimum duration of time to keep one or more switches in a conducting state to facilitate a critical conduction mode based, at least in part, on the peak inductor current;
selectively implementing, using a pulse inhibitor, one or more blank cycles based on an interaction between a voltage-error signal and a timing signal; and
generating a signal to keep the one or more switches in the conducting state for the minimum duration of time.

21. The method of claim 20, and further comprising:
detecting changes in a load current; and
transitioning between the critical conduction mode and a continuous conduction mode based, at least in part, on the detected changes in the load current.

22. The method of claim 20, wherein at least one switch of the one or more switches comprises a high-side switch.

23. The method of claim 20, wherein the minimum duration of time to be estimated so as to reduce a difference between an output voltage and a target voltage.

24. The method of claim 20, and further comprising transitioning between the critical conduction mode and a continuous conduction mode based, at least in part, on the current through an inductor.

* * * * *

UNITED STATES PATENT AND TRADEMARK OFFICE
CERTIFICATE OF CORRECTION

PATENT NO. : 11,347,250 B2
APPLICATION NO. : 16/442126
DATED : May 31, 2022
INVENTOR(S) : Tim Wen Hui Yu

It is certified that error appears in the above-identified patent and that said Letters Patent is hereby corrected as shown below:

In the Claims

Claim 18, Column 14, Line 5, "of claim 15" should read --of claim 17--.

Claim 19, Column 14, Line 9, "of claim 15" should read --of claim 17--.

Signed and Sealed this
Thirteenth Day of September, 2022

Katherine Kelly Vidal
*Director of the United States Patent and Trademark Office*